May 3, 1966  A. J. STEALY  3,248,819
MOTOR OPERATED SPINNING REEL
Filed March 11, 1963  5 Sheets-Sheet 1

INVENTOR.
ARTHUR J. STEALY
BY
Van Valkenburgh & Fields
ATTORNEYS

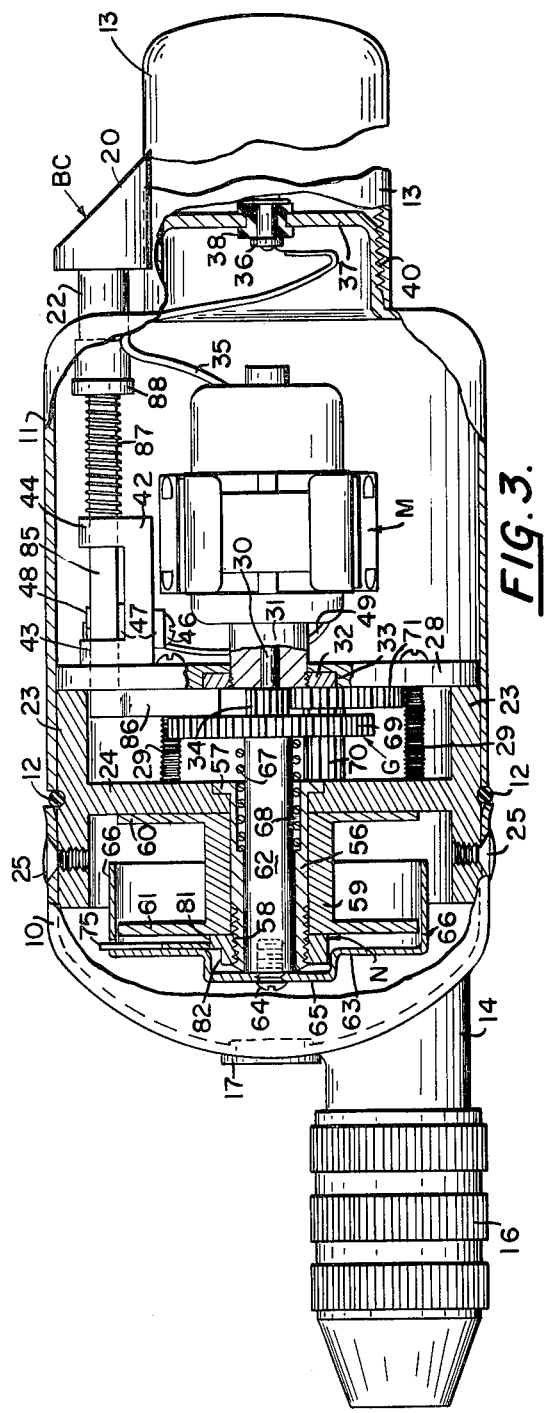

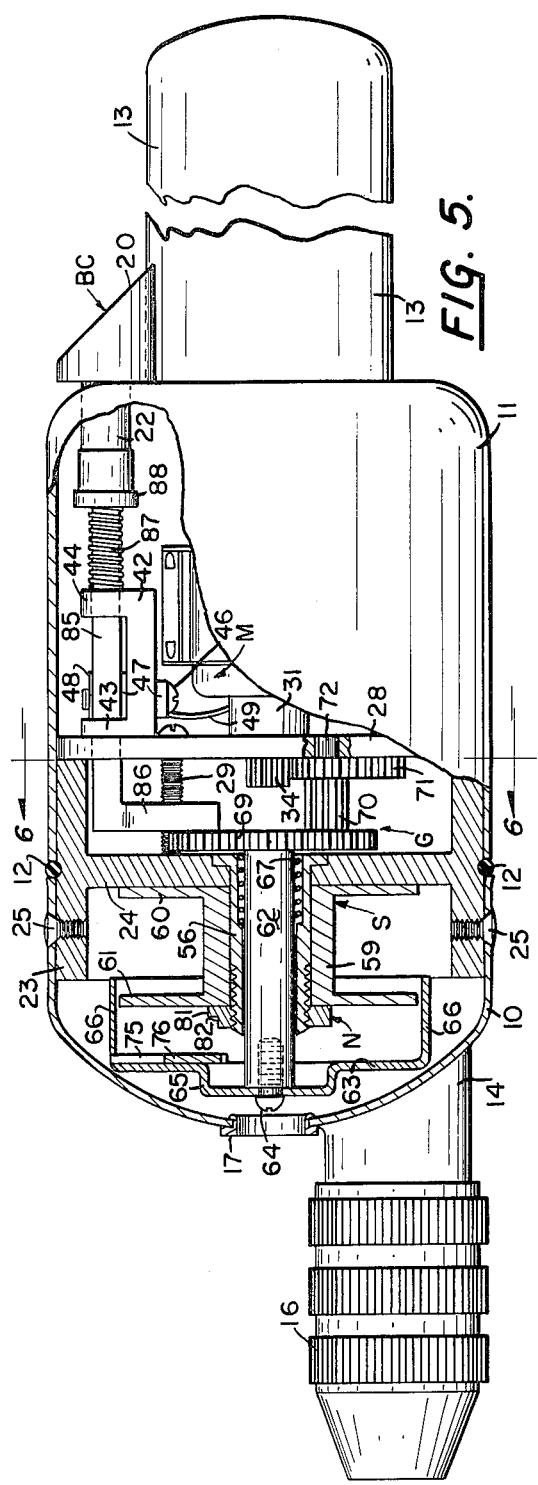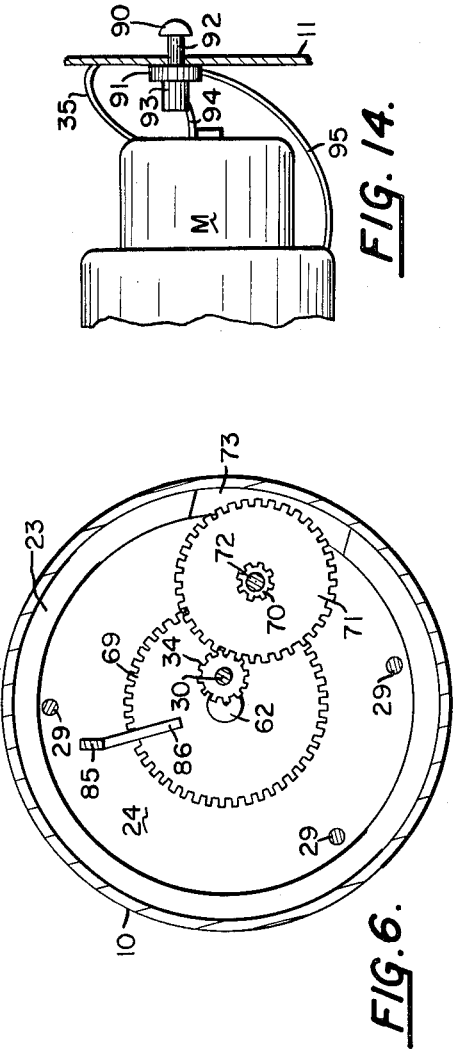

May 3, 1966  A. J. STEALY  3,248,819
MOTOR OPERATED SPINNING REEL
Filed March 11, 1963  5 Sheets-Sheet 4

INVENTOR.
ARTHUR J. STEALY
BY
Van Valkenburgh + Fields
ATTORNEYS

INVENTOR.
ARTHUR J. STEALY
BY
ATTORNEYS

United States Patent Office 3,248,819
Patented May 3, 1966

3,248,819
MOTOR OPERATED SPINNING REEL
Arthur J. Stealy, Aurora, Colo.
(11405 E. 7th Ave., Denver, Colo.)
Filed Mar. 11, 1963, Ser. No. 264,230
8 Claims. (Cl. 43—21)

This invention relates to a fishing reel, and more particularly to an electric fishing reel.

Fishing reels in use prior to this invention have had various inherent disadvantages and undesirable qualities. The usual fishing reel is hand operated, requiring considerable exertion on the part of the fisherman, hence reducing the amount of enjoyment received from fishing, as well as requiring complicated movements to be coordinated in a very short time, the difficulties in achieving which have often resulted in the loss of a fish. Automatic fishing reels of various types have been used, but many of these have been quite heavy and the fish line is easily tangled or fouled because of complicated mechanical arrangements. In other automatic fishing reels, the spool must rotate about both a longitudinal and lateral axis, making the reel quite complicated and unduly expensive. In addition, some automatic reels have inadequate means for controlling the "paying out" and rewinding of the line, sometimes resulting in the loss of a fish.

Among the objects of this invention are to provide a novel fishing reel; to provide such a fishing reel operated by a motor which is battery powered; to provide such a fishing reel in which a case for the battery serves as a handle for the fishing reel; to provide such a fishing reel having a stationary spool; to provide such a fishing reel wherein a fishing line pickup finger is automatically retracted by movement of the parts to casting position; to provide such a fishing reel wherein a pickup finger is quickly extended upon energization of the motor to rewind the fishing line; to provide such a fishing reel which is readily and quickly changed from casting to winding positions and vice versa; to provide such a fishing reel in which the user can grasp the handle with one hand and change from casting to winding without shifting his grasp of the handle, thereby quickly effecting the change; to provide such a fishing reel which is balanced in weight; to provide such a fishing reel which provides an automatic drag on the line; to provide such a fishing reel which can be used to brake the line, prior to casting or when playing a fish; to provide such a fishing reel which, if desired, may have an adjustable electrical brake or drag; and to provide such a fishing reel which is readily constructed and efficient in operation.

Additional objects and the novel features of this invention will become apparent from the description which follows, taken in conjunction with the accompanying drawings, in which:

FIG. 3 is a further enlarged, condensed side elevation of the automatic fishing reel of FIG. 1, with certain parts thereof broken away and other parts in longitudinal section to show the same more clearly, the parts being in a position in which a pickup finger is in extended, line engaging position;

FIG. 4 is an enlarged, longitudinal section of a combined battery case and handle of the fishing reel of FIG. 1;

FIG. 5 is a further enlarged, condensed side elevation, similar to FIG. 3, but showing the parts with the pickup finger in retracted position;

FIG. 6 is a vertical section, taken along line 6—6 of FIG. 5, showing particularly the drive gear arrangement;

FIG. 14 is a fragmentary side elevation, similar to a portion of FIG. 3, but showing a special drag construction.

Figure 1:
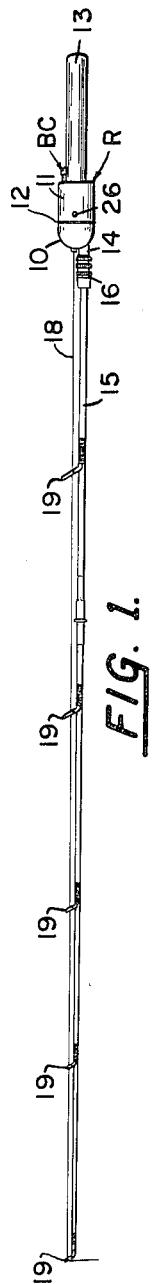
FIG. 1 is a side elevation of an automatic fishing reel of this invention, with a fishing pole mounted thereon.

In accordance with this invention, an automatic fishing reel R, as shown in FIG. 1, is provided with a front spool housing 10 and a rear motor housing 11, separated by an O-ring 12 which prevents moisture from entering the fishing reel, particularly to a motor M and gear train G of FIG. 3, which are described in greater detail below. Conveniently, a handle 13, which also serves as a battery case, as described below, is attached to the rear end of motor housing 11. The O-ring 12 also acts as a shock absorber for the whip of the rod during casting, to reduce the shock transmitted to the handle. A conventional, longitudinally slotted, fishing pole socket 14 extends forwardly from the lower front end of spool housing 10 and may be attached thereto, as by welding, so that a fishing pole, such as fishing pole 15 of FIG. 1, may be held in place by a ferrule 16 threadably received on socket 14. Conveniently, a central opening is provided in the front end of spool housing 10 above socket 14, at which is attached a collar 17, as in FIG. 5, through which a fishing line 18 may move from a stationary spool within the housing, the fishing line extending through a plurality of eyes 19 spaced along the fishing pole, as in FIG. 1.

Figure 2:
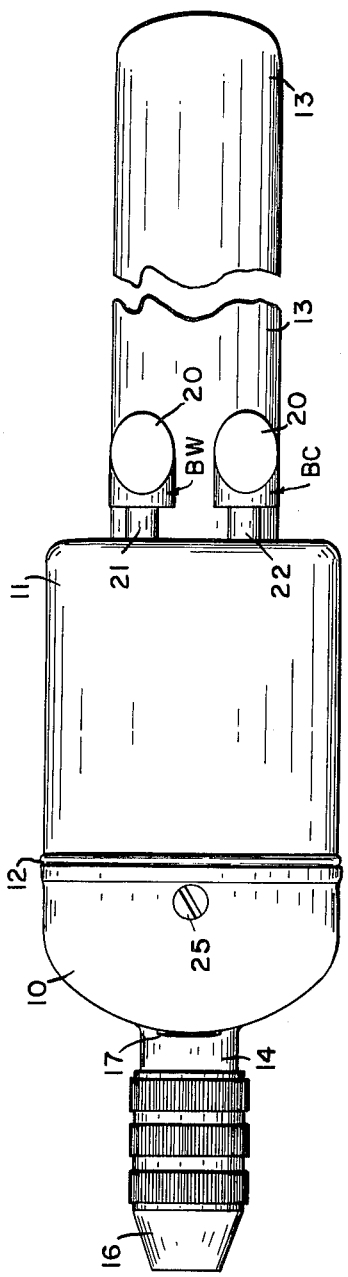
FIG. 2 is an enlarged, condensed top plan view of the automatic fishing reel of FIG. 1.

The handle 13 is adapted to be grasped by one hand of the user, for manipulation of the pole, the fingers being curled around the handle to place the thumb in position to push forwardly either a casting button BC of FIG. 2 or a winding button BW for casting and winding, respectively. Since the only manipulation necessary to shift from casting to winding position is a shift of the thumb from button BC to button BW, no complicated coordination of movement is necessary, so that the possibility of losing a fish through having to find and start turning a reel handle is avoided. Each button BC and BW is conveniently provided with a diagonal rear surface 20 to facilitate forward pressure of the thumb on the respective button, although a convex surface may be used. Button BW is mounted on a stem 21 which extends through an appropriately located hole in the upper rear of housing 11, while button BC is mounted on a similar stem 22. The parts with which buttons BW and BC cooperate are described below, each button being urged rearwardly by a spring, described later, which causes the button to move back to its rear position as soon as forward pressure thereon is released.

Both the spool housing 10 and the motor housing 11 are connected to a cylinder 23 which has a central, circular, shaft-supporting rib 24, as in FIG. 3. Thus, spool housing 10 may be attached to cylinder 23 by means of screws, such as screws 25 of FIG. 3, and motor housing 11 may be also attached to cylinder 23 by means of screws offset circumferentially from screws 25, such as screws 26 of FIG. 1. Advantageously, the O-ring 12 is received in a central peripheral groove 27 of cylinder 23, as shown more clearly in FIG. 8, so that the edges of spool housing 10 and motor housing 11 abut the O-ring to form a tight seal.

Within the fishing reel are two main components, the spool assembly S, located forwardly of rib 24, and the motor M, located rearwardly of rib 24. The motor M is mounted on a circular mounting plate 28, which is attached to the inner end of cylinder 23 by means of a plurality of circumferentially spaced screws 29, as in FIGS. 3, 5 and 6. Advantageously, motor M is a direct current motor and is connected generally centrally to plate 28, but is offset slightly to one side, for a purpose described below. Thus, motor M has a drive shaft 30 which extends through a mounting sleeve 31, at the front end of the motor, as in FIG. 3, the sleeve being held in position by a nut 32 which is received in a bore 33 in plate 28 and threadably received on the end of sleeve 31. A pinion 34 is mounted on the front side of plate 28, on the end of motor shaft 30, which also extends through plate 28, for driving the gear train G, as described below.

An electrical wire 35 extends from motor M and is soldered to a contact 36, extending through a rear cylindrical extension 37 of housing 11 and held in position by a bushing 38, conveniently formed of plastic or rubber. The motor is conveniently a 6 volt motor powered by four 1½ volt dry cells 39, which are arranged in series within the combined handle and battery case 13, as in FIG. 4. The outside of cylindrical extension 37 is provided with threads cooperating with threads 40 on the inside of the front end of battery case and handle 13, for attachment of the latter, while a conventional spring 41 is provided within the rear end of handle 13, to urge the batteries against contact 36. The four 1½ volt dry cells connected in series will provide 6 volts to the motor. Although a 6 volt motor and four 1½ volt dry cells have been illustrated and described, it will be understood that a motor requiring a different voltage may be powered by a different number of dry cells or by dry cells of a different voltage, handle 13 being of a size which accommodates the number and size of dry cells needed.

As will be evident, the weight of batteries 39 in the elongated handle 13 will more than offset the weight of motor M, gear train G and spool assembly S, so that the center of gravity of the reel will be at a point on handle 13. In fact, in a commerical device constructed in accordance with this invention, the center of gravity with a 5½ foot solid rod, made of fiberglass reinforced plastic, was at the rear edge of housing 11, and at the same point with a 6½ foot, hollow rod of the same material. Thus, the reel feels balanced to the user and can be held and shifted, as necessary, without undue physical strain. For this purpose, as many of the parts, such as housings 10 and 11, cylinder 23, plate 28 and the parts of spool assembly S, are made as light as possible, such as being formed of aluminum, except where steel or other material is necessary for wear or other purposes.

Figure 7:
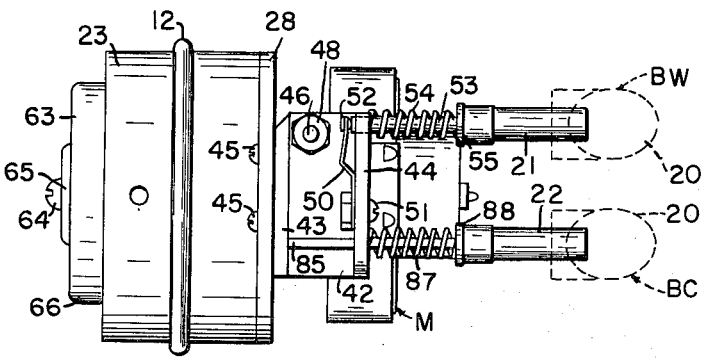
FIG. 7 is an enlarged, top plan view of the parts of the fishing reel of FIG. 1 within the housing, the housing being omitted for clarity of illustration.

The other side of the circuit of motor M includes spring 41, handle 13, motor housing 11 and plate 28, to which is connected a channel 42 of FIGS. 3, 5 and 7, having spaced upstanding flanges 43 and 44 and held in position by a pair of spaced screws 45, extending through plate 28 and into flange 43, as in FIG. 7. A contact post 46, as in FIGS. 3 and 7, extends vertically through the web of channel 42, adjacent flange 43, but is insulated therefrom by means of a rubber bushing 47, as in FIG. 3, and is held in place by a nut 48 which serves as a terminal for a switch, adapted to be closed by winding button BW. The lower end of contact post 46 is connected by means of an electrical wire 49 to motor M.

As in FIG. 7, the above switch includes a spring arm 50, attached to flange 44 of channel 42 by a bolt 51 and having a contact point 52 at the outer end thereof, which is normally out of contact with nut 48, although a conventional type of switch may be utilized. Conveniently, a hole is provided in flange 44, adjacent contact point 52, through which extends and operating pin 53, conveniently formed of plastic or other insulating material. Pin 53 is normally urged rearwardly by means of a coil spring 54 extending therearound, one end of spring 54 bearing against the rear surface of flange 44 and the other end bearing against a shoulder 55 on stem 21, which receives the rear end of operating pin 53 and is attached thereto by a suitable adhesive, or may be integral therewith, if desired. Button BW is conveniently secured to the rear end of stem 21, as in FIG. 7, while button BC may be similarly secured to the rear end of stem 22. As will be evident, spring 54 also returns finger button BW to rear position after release. Thus, when button BW is pressed forwardly, contact point 52 will engage nut 48 and the circuit will be completed to motor M, which will start, but when button BW is released, the circuit will be broken and motor M will stop.

Figure 8:
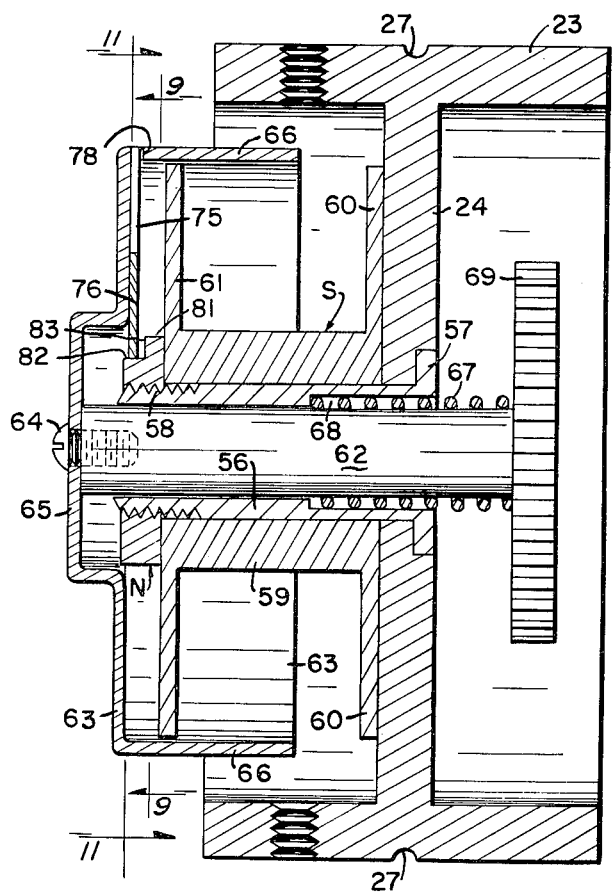
FIG. 8 is a further enlarged, longitudinal section of a spool assembly of the reel of FIG. 1, showing the movable parts during movement to the position of FIG. 3, with the pickup finger already in retracted position.

The spool assembly S, as in FIGS. 3, 5 and 8, includes a fixed bushing sleeve 56, conveniently made of brass and extending forwardly from rib 24, being provided with a peripheral inner flange 57 received in a recess in the rear side of plate 24 and threads 58 at the outer end. A fixed spool 59 is received over sleeve 56 and is held in place by means of a cam nut N, engaging the threads 58. Thus, spool 59 is mounted in a stationary position, with an inner flange 60 engaging rib 24 and an outer flange 61 clamped by nut N. A shaft 62 extends from gear train G through bushing 56 and is both rotatable and movable axially in the bushing. A line guiding cup 63 is attached to the outer end of shaft 62, as by a screw 64, and conveniently has a central offset 65, which receives the end of shaft 62 and is offset approximately the thickness of nut N, for a purpose to be described. Cup 63 is provided with a peripheral flange 66, which extends inwardly over spool flange 61 and a portion of spool 59. Shaft 62 is moved forwardly by casting button BC, in a manner to be described, but is normally urged rearwardly by a coil spring 67 extending therearound and received in a counter bore 68 in the inner end of bushing 56, the other end of spring 67 bearing against a gear 69 which is mounted, as by pressing, on the reduced inner end of shaft 62. Since shaft 62 may both rotate within bushing 56 and move longitudinally therein, as indicated, this will result in the same movement of cup 63.

In the gear train G, as in FIGS. 3, 5 and 6, gear 69 is driven by a spline pinion 70, which permits axial movement of gear 69 without disengagement and which is mounted conjointly with a gear 71, as by merely pressing gear 71 on spline 70, on a pin 72, which is journalled at opposite ends in rib 24 and plate 28, as in FIG. 5. It will be noted that pin 72 is spaced to one side and downwardly from both flange 57 and bushing 56 in rib 24, and counter bore 33 in plate 28, as will be evident from FIG. 6. Cylinder 23 is advantageously provided with a cutout 73 to accommodate gear 72, as in FIG. 6, while a bushing is preferably inserted in a hole in each of rib 24 and plate 28, to provide a bearing for the opposite ends of pin 72. Gear 71 is engaged by pinion 34 mounted on motor shaft 30, to cause the gear train to be driven by the motor M and cup 63 to be rotated thereby, at a considerably reduced speed. The speed reduction of gear train G may be on the order of 27 to one, such as provided by motor pinion 34 having 8 teeth, gear 71 having 36 teeth, spline pinion 70 having 8 teeth, and gear 69 having 48 teeth. Since gear 69 thus has a greater diameter than gear 71, motor shaft 30, as in FIG. 6, is conveniently offset slightly from center. Also, gear 69 is conveniently formed of nylon, not only for quietness and wear, but also for a further purpose to be described.

Cup 63 is provided with a pickup finger 75, as in FIG.

Figure 13:
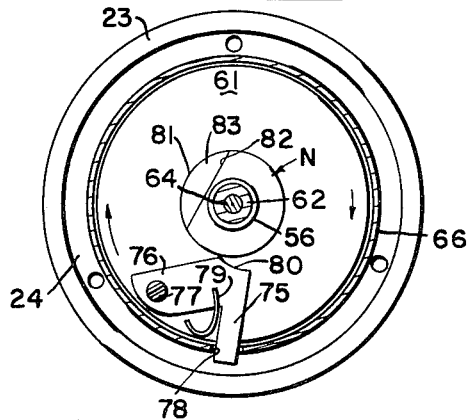
FIG. 13 is a vertical section, similar to FIG. 11, but with the pickup finger in final cam-engaging position after further rotation.

9, which is formed angularly and the inner arm 76 of which is pivoted on cup 63, as by means of a screw 77. Pickup finger 75 is adapted to be moved so as to extend through a slot 78 in flange 66 of cup 63, as in FIG. 13, but is normally urged inwardly by a leaf spring 79, the inner end of which extends into a slot in arm 76, as shown, and the outer end of which conveniently bears against the inside of cup flange 66. Thus, when shaft 62 is moved inwardly by coil spring 67, a concave, arcuate cam-engaging surface 80 at the inner end of finger 75 rides onto the outer periphery of nut N, in a manner to be described, causing pickup finger 75 to project beyond flange 66, as in FIGS. 3 and 13, and pick up the fish line as cup 63 rotates to wind the line on spool 59. However, when shaft 62 is moved axially forwardly for casting, cam-engaging surface 80 will no longer contact nut N, allowing spring 79 to move pickup finger 75 inwardly, so that it does not project beyond flange 66 of cup 63, as in FIG. 5. During such forward movement, as soon as shaft 62 approaches the position of FIG. 8, the pickup finger will drop off nut N, so forward movement of casting button BC of a limited extent only is necessary to retract the pickup finger. Thus, when casting, the casting button BC is pushed all the way forward, to trap the line between the periphery of cup 63 and the inside of housing 10, as the pole is raised, then button BC is released slightly as the cast is made, so that the line will move freely off the spool.

Figure 9:
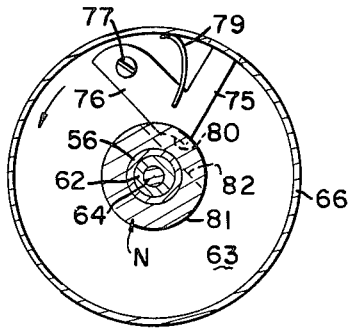
FIG. 9 is a vertical section, on a reduced scale, taken along line 9—9 of FIG. 8.
Figure 10:
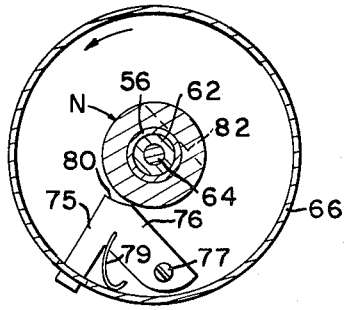
FIG. 10 is a vertical section, similar to FIG. 9, but showing the pickup finger in extended, cam-engaging position after movement from the position of FIG. 9.
Figure 11:
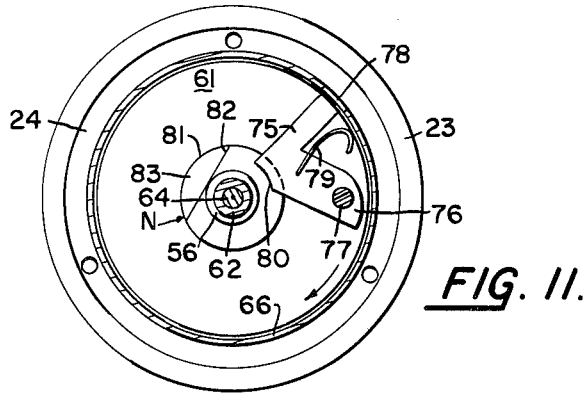
FIG. 11 is a vertical section, on a reduced scale, taken from the position of line 11—11 of FIG. 8, with the pickup finger disengaged from the cam and in retracted position.
Figure 12:
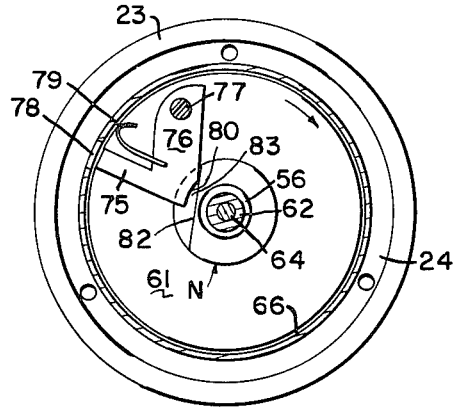
FIG. 12 is a vertical section, similar to FIG. 11, but with the pickup finger in an initial cam-engaging position after rotation from the position of FIG. 11.

For winding purposes, the rear half 81 of the periphery of nut N is circular, as in FIG. 8, while the front half is also circular except for a cam surface 82 which conveniently extends tangentially across the front half, as in FIGS. 5 and 11, with a shoulder 83 at the rear edge thereof. Cam surface 82 also permits a wrench to be used more readily in tightening cam nut N. Leaf spring 79 is preferably so proportioned that it will hold pickup finger 75 in a retracted position in which the inner cam-engaging surface 80 is disposed at a position slightly outwardly from the center of cam surface 82 on nut N, as in FIGS. 9 and 12. When cup 63 has been moved forwardly by button BC for casting, as to the position of FIG. 5, pickup finger 75 will remain in front of nut N. When spring 67 moves cup 63 rearwardly, the inner end of the pickup finger will abut either the front end of nut N, as in FIG. 11, or will coincide with cam surface 82, as in FIG. 12, and abut shoulder 83, being urged thereagainst by spring 67. In the former event, when the motor M is started, pickup finger 75 will move to the position of FIG. 12, again being urged by spring 67, and during the first revolution of nut N, cam-engaging surface 80 will engage one side of cam surface 82, as will be evident from FIG. 9, and causes cam-engaging surface 80 to ride up onto the periphery of the front half of nut N, as in FIG. 10. This will permit cup 63 and pickup finger 75 to move rearwardly from the position of FIG. 10, by the pressure of spring 67, and surface 80 will ride on the circular rear half 81 of the periphery of nut N, as in FIG. 3 as long as motor M rotates.

When it is desired to cast, with motor M stopped, of course, it is necessary that shaft 62 be moved forwardly, so that pickup finger 75 will be retracted. This is accomplished by the fisherman pressing forwardly on casting finger butttton BC, as indicated previously. Stem 22 of button BC is attached to or integral with a bar 85, preferably generally rectangular in cross section to prevent twisting and extending through rectangular holes in each of flanges 43 and 44 of channel 42 and in plate 28. Bar 85, at its front end as in FIGS. 3, 5 and 6, is provided with a preferably integral, downwardly extending arm 86 which is adapted to abut gear 69 to move gear 69 forwardly and shaft 62 and cup 63 along with it, when button BC is pressed. By making gear 69 of nylon, wear due to friction is reduced, since arm 86 remains stationary and during rotation of gear 69, spring 68 will press gear 69 against arm 86. To return button BC to its initial position when pressure thereon is released, a coil spring 87 surrounds bar 85, one end of the spring bearing against the rear surface of flange 44 and the other end bearing against a collar 88 on stem 22. Thus, when button BC is pushed forwardly, arm 86 will move gear 69 forwardly, forcing shaft 92 forwardly so that cup 63 is also moved forwardly, causing pickup finger 75 to clear nut N, so that leaf spring 79 will move pickup finger 75 inwardly through slot 78 and the pickup finger can no longer engage fishing line 18. Thus, in this position the fishing line is free to be pulled off the reel by the usual casting operation.

To wind the fishing line 18, it is merely necessary to release button BC and press button BW to complete the circuit to motor M. This will cause cup 63 to rotate, as explained above, and will permit coil spring 67 to move shaft 62 rearwardly, along with cup 63 and pickup finger 75. As explained previously, this will cause pickup finger 75 to ride up onto the circular rear half 81 of nut N, thereby extending the pickup finger through slot 78, as in FIGS. 10 and 13, so that the pickup finger 75 will engage the fishing line 18 and wind it onto stationary spool 58. When the line is wound in to the desired extent on the spool, the motor may be stopped by releasing button BW and the fish, if still on the hook, captured.

In addition to casting by pushing button BC or winding by pushing button BW, an automatic drag may also be placed on the line, in the event the fisherman wishes to permit the fish to run with the line, during winding, merely by releasing button BW during winding, while the pickup finger is still extended. If there is any question as to whether or not the pickup finger is extended, button BW may be pushed momentarily to produce a few revolutions of the motor to insure engagement of pickup finger 75 with the rear surface 81 of cam nut N. Such a drag is caused by the fact that, with the pickup finger extended, when the fish runs with the line, cup 63 is turned and shaft 62 with it. This will rotate the gear train and motor in reverse, producing a braking effect on the line. In addition, when coil spring 67 is wound in a direction opposite to the normal direction of rotation of shaft 62, the rear end of spring 67 will follow gear 69 during normal rotation, and thus produce a minimum of resistance to rotation, but will resist rotation of gear 69 in the reverse direction. If desired, additional drag may be secured by energizing the field only of motor M, if a wound field type, or if a permanent magnet type, by placing a resistance in series with the motor armature, thereby operating the motor as a generator. As in FIG. 14, such a construction may be operated through a button 90 mounted in a convenient position, as on the rear end of housing 11. Such a resistance may be a variable resistance 91, as of a rheostat type, so that the drag may be adjusted by turning button 90, which has a stem 92 constructed, as by slotting, so that the stem may be pushed forwardly by button 92 to close switch 93, without changing the setting of the variable resistance. A wire 94 may connect one side of switch 93 with the same motor terminal as wire 35, while a wire 95 may connect one side of variable resistance 91 with the same motor terminal as wire 49, the opposite sides of switch 93 and variable resistance 91 being connected to each other in a conventional manner.

From the foregoing, it is readily apparent that a fishing reel constructed in accordance with this invention fulfills to a marked degree the requirements and objects hereinbefore set forth. An automatic fishing reel has been provided which is operated by one or more batteries located in the handle of the fishing reel. Furthermore, the fishing reel utilizes a stationary spool and a rotatable pickup finger which is retractable for casting and extensible for rewinding. For casting, one button is pressed and for winding, a closely located button is pressed and the movement of the fisherman's thumb, from one button to the other, without shifting the grip on the handle, is readily accomplished. The nut N not only attaches the cup to the shaft, but also is provided with a cam surface which moves the pickup finger to winding position. In addition, the pickup finger is usually moved into line engaging position during the first revolution of the nut, so that winding is started quickly and automatically, when the motor is started. The batteries are readily replaced, when necessary, while the weight of the batteries balances the weight of the motor and gear train, so that the reel and rod are more easily handled by the fisherman. The gear train is compact and does not interfere with shifting from casting to winding position and vice versa, since the movable gear is always in engagement with the spline pinion. The cup carrying the pickup finger may be pushed forwardly against the inside of the front housing, to brake the line, while the forward movement of the cup which carries the pickup finger prevents a sudden jerk by the fish from breaking the line. Also, an automatic drag on the line is provided, with the line engaging the pickup finger, while an electrical drag is readily provided and is easily made adjustable. As will be evident, the fishing reel of this invention is readily constructed and highly efficient in operation.

It will be understood that the spool, pickup finger and cam nut and its shaft and push button for shifting the shaft may be utilized in a crank type reel to advantage.

Although a preferred embodiment of this invention has been illustrated and described and certain variations shown, it will be understood that various other changes and variations may be made without departing from the spirit and scope of this invention.

What is claimed is:

1. A fishing reel including
 a cylinder having a central rib extending transversely thereof intermediate its inner and outer ends, said rib having a central aperture;
 a plate having an aperture therein and mounted on said inner end of said cylinder;
 a sleeve extending through said rib aperture and forwardly therefrom;
 a winding shaft extending through said sleeve for rotation and longitudinal movement therein, said winding shaft having a length substantially greater than said sleeve;
 a spool, having a pair of spaced flanges, on the outer end of said sleeve;
 a nut threadably received on the outer end of said sleeve for holding said spool in position with the rear flange thereof abutting said rib;
 a cup fixedly mounted on the outer end of said shaft and having an inwardly extending rim with a slot therein;
 a finger pivotally attached to the front wall of said cup and mounted for movement through said slot;
 cam means on said nut adapted to engage said finger when said winding shaft is moved rearwardly so as to cause said finger to extend through said slot;
 a motor mounted on said plate on the side opposite said cylinder and having a drive shaft extending through said plate aperture;
 a spline pinion rotatably mounted between said rib and said plate;
 a gear mounted on the inner end of said winding shaft and engaging said spline for movement therealong;
 a second gear mounted on the inner end of said spline adjacent said plate;
 a pinion mounted on said drive shaft and engaging said second gear; and
 means for moving said winding shaft longitudinally within said sleeve to cause said finger alternatively to engage and disengage said cam means.

2. A fishing reel, as set forth in claim 1, including shifting means extending through said plate and movable longitudinally therethrough, said shifting means engaging said first gear for moving said winding shaft longitudinally in said sleeve.

3. A fishing reel, as set forth in claim 2, wherein said shifting means includes a bar having a non-circular cross section and having a depending arm which engages said first gear.

4. A fishing reel, as set forth in claim 3, wherein said shifting means further includes
 a finger button having a stem mounted on the rear end of said shifting bar;
 said stem having a collar at the front end thereof; and
 a coil spring surrounding said bar and bearing against said collar to normally urge said bar and finger button rearwardly.

5. A fishing reel comprising
 a generally hemispherical front housing having a socket for receiving a fishing rod extending from the forward end thereof and terminating in a rear peripheral flange;
 a generally hemispherical rear housing having a front peripheral flange;
 a cylinder having a central, peripheral, exterior groove;
 an O-ring in said groove, said rear flange of said front housing and said front flange of said rear housing engaging opposite sides of said O-ring and being received over the respective front and rear ends of said cylinder;
 means connecting said housing to said cylinder;
 a hollow handle attached to and extending rearwardly from the rear end of said rear housing, said handle being adapted to receive dry cells to power said fishing reel;
 an electrical motor within said rear housing;
 a fixed, line receiving spool within said front housing;
 a rotatable, extensible and retractable winding means disposed in said front housing and operatively connected with said motor for winding a fishing line onto said spool;
 a pair of buttons, each mounted on a stem extending rearwardly through said rear housing, said buttons being disposed in adjacent positions adjacent said handle;
 means for moving said winding means forwardly and operated by one of said buttons; and
 switch means for controlling said motor and operated by the other of said buttons.

6. A fishing reel, as set forth in claim 5, wherein said rear housing is provided with a central, cylindrical rear extension having threads for attachment of said handle; and
 an insulated contact for the front dry cell mounted centrally in said extension.

7. A fishing reel, as set forth in claim 6, including
 an interior, transverse rib intermediate the front and rear ends of said cylinder;
 a plate mounted on the rear end of said cylinder, said motor being attached to the rear side of said plate and having a drive shaft extending therethrough;
 a pinion spline rotatably mounted between said rib and said plate;
 a first gear mounted on said spline adjacent said plate;
 a pinion mounted on said drive shaft for engaging said first gear;
 a sleeve extending through said rib and forwardly therefrom;
 a spool having spaced flanges mounted on said sleeve with one said flange bearing against the front of said rib;
 a nut having a cam surface, threadably received on said sleeve and bearing against the front of said spool;
 a winding shaft extending through said sleeve and having a length greater than that of said sleeve;
 a second gear mounted on the rear end of said winding shaft in operative engagement with said spline;

a coil spring surrounding said winding shaft with one end bearing against a shoulder in said sleeve and the other end bearing against said second gear, for urging said winding shaft rearwardly;

a cup having a front wall attached to the front end of said winding shaft and a peripheral rim having a slot therein and extending rearwardly over the front flange of said spool;

a finger pivoted on the rear side of said front wall of said cup and having a concave inner end adapted to engage said cam surface and thereby be moved onto the peripheral edge of said nut to pivot said finger so that it extends through said slot;

a leaf spring extending between said rim and said finger, normally urging said finger inwardly to a retracted position; and means mounted on and movable through said plate for urging said winding shaft forwardly against the force of said coil spring, so that said inner end of said finger rides off said nut and said leaf spring retracts said finger.

8. A fishing reel including a housing;

a fixed spool having spaced flanges mounted within said housing;

an electric motor mounted within said housing;

a rotatable, extensible and retractable winding means mounted adjacent said spool and operatively connected to said motor for winding a fishing line onto said spool;

an electrical circuit for supplying current to said motor;

a variable resistance adapted to be introduced into said circuit, said motor being constructed and arranged to resist rotation of said winding means upon introduction of said resistance in said circuit;

a switch for introducing said resistance in said circuit; and a button having a stem for closing said switch and also for adjusting said variable resistance.

References Cited by the Examiner

UNITED STATES PATENTS

| 2,627,383 | 2/1953 | Tibbetts | 242—84.2 |
| 2,866,291 | 12/1958 | Duell | 242—84.2 |
| 3,028,115 | 4/1962 | Hammer | 242—84.2 |
| 3,032,290 | 5/1962 | Wallace | 242—84.21 |
| 3,064,385 | 11/1962 | Pickard | 242—84.1 |
| 3,077,319 | 2/1963 | Nurmse | 242—84.21 |
| 3,105,651 | 10/1963 | Hull | 242—84.2 |
| 3,116,892 | 1/1964 | Pickard | 242—84.1 |

FOREIGN PATENTS 820,874 9/1959 Great Britain.

OTHER REFERENCES

Erickson and Bryant, Electrical Engineering Theory and Practice. John Wiley & Sons, 1959.

MERVIN STEIN, *Primary Examiner.*

B. S. TAYLOR, *Assistant Examiner.*